United States Patent
Doran et al.

(10) Patent No.: US 12,299,682 B2
(45) Date of Patent: May 13, 2025

(54) SOCIAL NETWORK PAYMENT SYSTEM

(71) Applicant: PayPal, Inc., San Jose, CA (US)

(72) Inventors: Thomas Anthony Doran, Palo Alto, CA (US); Dennis Warren Koo Tze Mew, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 276 days.

(21) Appl. No.: 17/563,316

(22) Filed: Dec. 28, 2021

(65) Prior Publication Data

US 2022/0122069 A1    Apr. 21, 2022

Related U.S. Application Data

(63) Continuation of application No. 15/653,221, filed on Jul. 18, 2017, now Pat. No. 11,250,426, which is a continuation of application No. 13/310,127, filed on Dec. 2, 2011, now Pat. No. 9,710,812.

(60) Provisional application No. 61/419,750, filed on Dec. 3, 2010.

(51) Int. Cl.
G06Q 20/40 (2012.01)
G06Q 20/08 (2012.01)

(52) U.S. Cl.
CPC ............. *G06Q 20/40* (2013.01); *G06Q 20/08* (2013.01)

(58) Field of Classification Search
CPC ...... G06Q 20/40; G06Q 20/08; G06Q 20/384; G06Q 20/386
See application file for complete search history.

(56) References Cited

U.S. PATENT DOCUMENTS

| | | |
|---|---|---|
| 7,711,690 B1 | 5/2010 | Garrison et al. |
| 9,710,812 B2 | 7/2017 | Doran et al. |
| 2005/0144452 A1 | 6/2005 | Lynch et al. |
| 2006/0015463 A1 | 1/2006 | Gupta et al. |
| 2006/0085259 A1 | 4/2006 | Nicholas et al. |
| 2006/0265243 A1 | 11/2006 | Racho et al. |
| 2007/0299745 A1 | 12/2007 | Mulderry et al. |
| 2008/0046366 A1 | 2/2008 | Bemmel et al. |

(Continued)

OTHER PUBLICATIONS

European Appl. No. 11844197.1, Extended European Search Report mailed Apr. 4, 2014, 5 pages.

(Continued)

*Primary Examiner* — Steven S Kim
*Assistant Examiner* — Karlyannie M. Garcia
(74) *Attorney, Agent, or Firm* — Haynes and Boone, LLP

(57) ABSTRACT

A method for providing social network payments includes receiving a request to make a payment. The request is associated with a social network payer and a social network payee. It is determined that the social network payer is associated with a first payment provider identifier and an authorization token, and a second payment provider identifier for the social network payee is then retrieved using the authorization token. An instruction to make a payment from the social network payer to the social network payee is then transmitted to a payment service provider. The instruction includes a payment amount, the first payment provider identifier, and the second payment provider identifier. A payment alert is also adapted for a payee social network associated with the social network payee, and the payment alert is send to a social network provider device associated with the payee social network.

20 Claims, 10 Drawing Sheets

(56) References Cited

U.S. PATENT DOCUMENTS

| | | |
|---|---|---|
| 2008/0109352 A1 | 5/2008 | Csoka |
| 2008/0207296 A1 | 8/2008 | Lutnick et al. |
| 2009/0076952 A1 | 3/2009 | Cadenas et al. |
| 2009/0292814 A1* | 11/2009 | Ting .................. G06Q 50/01 |
| | | 709/229 |
| 2010/0030578 A1 | 2/2010 | Siddique et al. |
| 2010/0077045 A1 | 3/2010 | Bercu et al. |
| 2010/0287250 A1 | 11/2010 | Carlson et al. |
| 2011/0137789 A1* | 6/2011 | Kortina ............... G06Q 20/384 |
| | | 705/38 |
| 2011/0161233 A1 | 6/2011 | Tieken |
| 2011/0173443 A1* | 7/2011 | Osterwalder ......... H04L 63/123 |
| | | 713/168 |
| 2012/0150734 A1* | 6/2012 | Bangah ............... G06Q 20/381 |
| | | 705/39 |
| 2014/0164956 A1 | 6/2014 | Jojgov et al. |
| 2014/0195930 A1 | 7/2014 | Rajagopal et al. |

OTHER PUBLICATIONS

International Appl. No. PCT/US2011/063109, PCT International Search Report and Written Opinion mailed Apr. 5, 2012, 5 pages.
International Preliminary Report on Patentability for Application No. PCT/US2011/063109 mailed on Jun. 13, 2013, 5 pages.

* cited by examiner

SOCIAL NETWORK PAYMENT SYSTEM

CROSS REFERENCE TO RELATED APPLICATION

This patent application is a continuation of U.S. patent application Ser. No. 15/653,221, filed Jul. 18, 2017, which is a continuation of U.S. patent application Ser. No. 13/310,127 filed Dec. 2, 2011 (now U.S. Pat. No. 9,710,812, issued on Jul. 18, 2017), which claims the benefit of priority to U.S. Provisional Patent Application Ser. No. 61/419,750, filed Dec. 3, 2010, all of which are incorporated by reference in their entirety.

BACKGROUND

Field of the Disclosure

The present disclosure generally relates to online and/or mobile payments and more particularly to a social network payment system for making online and/or mobile payments.

Related Art

More and more consumers are purchasing items and services over electronic networks such as, for example, the Internet. Consumers routinely purchase products and services from merchants and individuals alike. The transactions may take place directly between a conventional or online merchant or retailer and the consumer, and payment is typically made by entering credit card or other financial information. Transactions may also take place with the aid of an online or mobile payment service provider such as, for example, PayPal, Inc. of San Jose, CA. Such payment service providers can make transactions easier and safer for the parties involved. Purchasing with the assistance of a payment service provider from the convenience of virtually anywhere using a mobile device is one main reason why on-line and mobile purchases are growing very quickly.

Internet users are increasingly using social networking websites as a means to keep in contact with friends, business associates, and/or other relationships. Some users may belong to several different social networks that may include friend networks such as, for example, those provided by MYSPACE® and FACEBOOK®, business networks such as, for example, those provided by LINKEDIN®, review network such as, for example, those provided by YELP®, messaging networks such as, for example, those provided by TWITTER®, and/or a variety of other social networks known in the art. While these social networks provide users with many different ways to interact with their friends, business associates, and/or other relationships, one area in which they are lacking is in providing the ability for their users to make payments to other users within and/or outside the social network seamlessly (i.e., without leaving the social networking website.) Currently, if a user within a social network wishes to make a payment to another user, that user must retrieve an identifier for the user that is registered with, for example, a payment service provider, leave the social networking website, and go to a payment service provider website to schedule the payment using the identifier. Making payments in such a manner is undesirable and disruptive to the user's social network experience.

Thus, there is a need for an improved social network payment system.

SUMMARY

According to one embodiment, a method for providing social network payments includes a social network payment gateway that couples a payment service provider to a plurality of social networks that each include a plurality of users. The social network payment gateway allows a user in a social network to make payments to users in that social network and/or in other social networks without having to leave their social network. For example, the social network payment gateway may operate with a social network (e.g., through an embedded application) to allow a user to select users from a plurality of social networks, create payment requests for those users, and send those payment requests without ever leaving their social network. The social network payment gateway may then use the payment requests to instruct a payment service provider to make the appropriate payments. The social network payment gateway may also provide payment alerts to any users that are receiving a payment, whether or not those users are in the same social network as the user making the payment, and those payments alerts are received in the social network by those users such that the entire payment process is completed without either user (the payer or the payee) having to leave their social network(s).

In an embodiment, payment requests sent by a user include an payer identifier for that user. The social network payment gateway receives the payment request, uses the payer identifier to retrieve an authorization token that authorizes the social network payment gateway to access the social networks of the payer user in order to retrieve payee identifiers for the payee users to whom the payer user wishes to make a payment. The payer identifier and the payee identifiers may then be used to instruct the payment service provider to make the payments.

In an embodiment, the social network payment gateway includes social network adapters that may be used to adapt payment alerts for different social networks. For example, a payer user may send payments to payee users in a plurality of different social networks, and the social payment gateway can use the social payment adapters to adapt payment alerts, which alert the payee users that they have been sent a payment, for each of the different social networks.

As a result, a payer user may provide payments in a social network simply by selecting payee users from any of a plurality of social networks in which the payer user is a member, designating a payment amount for each payee user selected, and sending the payment request. The payee users then receive payment alerts in their social network(s) that indicate that they have received a payment, and the payment service provider transfers funds from the payer user to the payee users, all without the payer user or the payee users having to leave their social networks.

These and other features and advantages of the present disclosure will be more readily apparent from the detailed description of the embodiments set forth below taken in conjunction with the accompanying figures.

Figure 1:
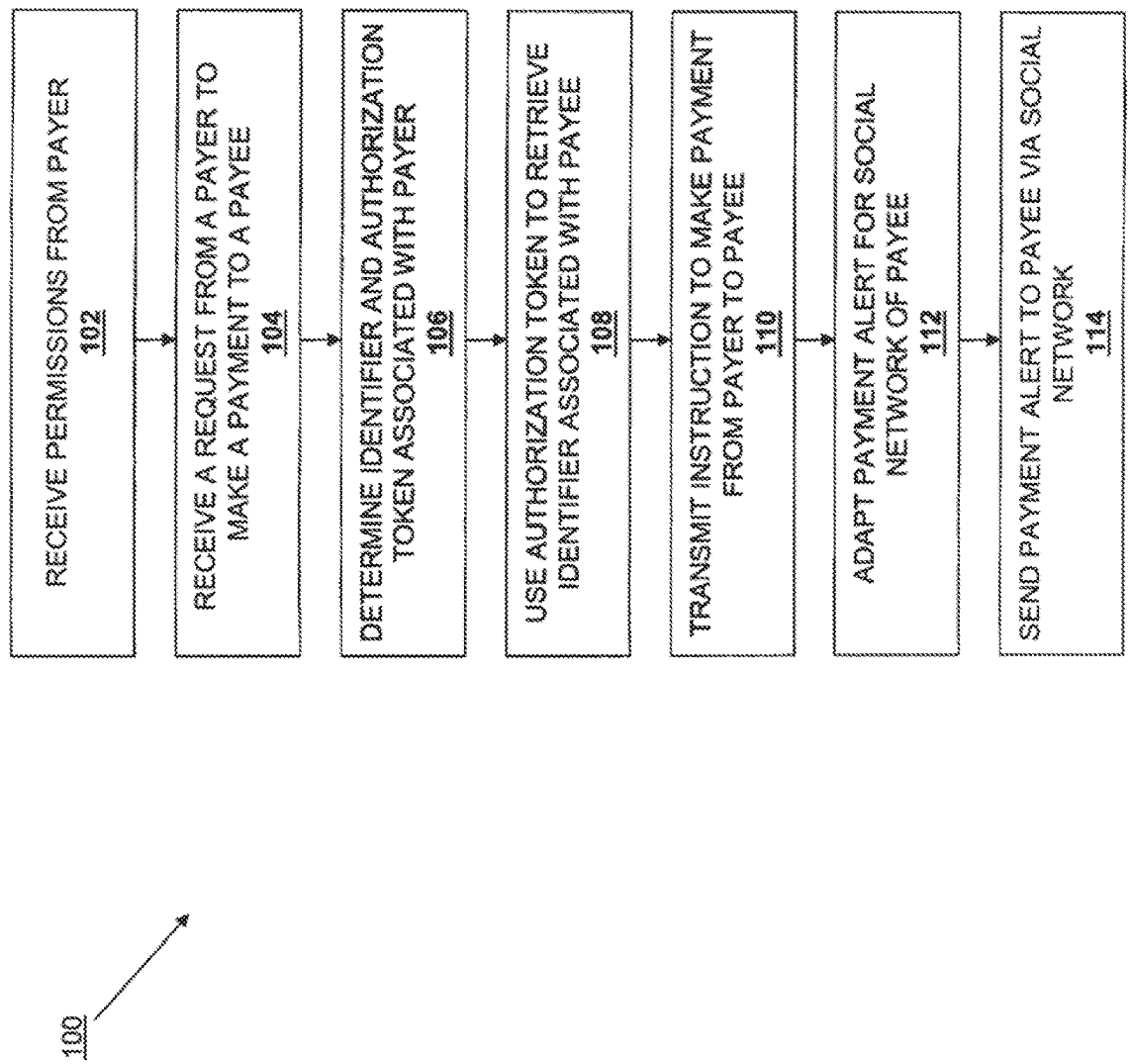
FIG. 1 is a flow chart illustrating an embodiment of a method for providing social network payments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for providing social network payments between users on one or more social network websites. A payer user may create a payment request by selecting payee users from a plurality of social networks with which the payer user is a member, designating a payment amount for each payee user, and sending the payment request, all while remaining within a social network website. The payment request is received by a social network payment gateway that receives and/or retrieves identifiers for the payer user and the payee users, provides the payment request and the identifiers to a payment service provider to make the payments, adapts payment alerts for each payee user and their corresponding social network, and sends the payment alerts to the payee users. The system and method allow a payer user to send, and payee users to receive, payments without having to leave their respective social network websites.

As discussed in further detail below, the system and method of the present disclosure include a communications network coupled to user devices, social network provider devices, a social network payment gateway device, and a payment provider device. In an embodiment, the social network provider devices may be used to provide social networks to the users of the user devices. For example, users may create user profiles on one or more social networks, and each user may be connected to other users in a social network as long as those users each include a user profile on that social network. Thus, each user may be connected to a plurality of other users in each of the different social networks to which that user belongs. In an embodiment, the payment provider device may be used by a payment service provider to provide payment services (e.g., online and/or mobile payment services) to users of the user devices. For example, users may have payment accounts with the payment service provider and may link those payment accounts with financial accounts of the user (e.g., checking accounts, savings accounts, credit accounts, etc.) such that the user may instruct the payment service provider to make payments to other users of the user devices using the financial accounts. In an embodiment, the social network payment gateway device provides a social network payment gateway that allows payments to be made within and across the social networks between users. While the social network payment gateway device is discussed as a separate device, one of skill in the art will recognize that the social network payment gateway device may be part of the payment provider device, the social network provider device, and/or a plurality of other devices known in the art without departing from the scope of the present disclosure.

Referring now to FIG. 1, a method 100 for providing social network payments is illustrated. The method 100 begins at block 102 where permissions are received from a payer user. As discussed above, a user of a user device may have user profiles on a plurality of social networks and may have a payment account with a payment service provider. In an embodiment, the payment service provider and/or the social network payment gateway may provide a payment application for each social network that allows payments to be made between users of a social network or between users in different social networks. For example, a user that wishes to send payments from a social network may associate their user profile in that social network with an embedded payment application that essentially becomes part of their user profile for that social network. Association of a payment application with a user profile in a social network may involve a user sending instructions from a user device over a network to a social network provider device to associate the payment application with the user profile, and the social network provider device associating the payment application with the user profile (e.g., by retrieving the payment application over the network from the payment service provider device and/or the social network payment gateway device, by retrieving the payment application from a database connected to the social network provider device, etc.) One of skill in the art will recognize that a different payment application may be provided for each different social network due to differences in the structure and operation of the different social networks. Thus, a user that wishes to be capable of making payments from any of the plurality of different social networks for which they have a user profile may associate a payment application with each user profile for each different social network.

Figure 2:
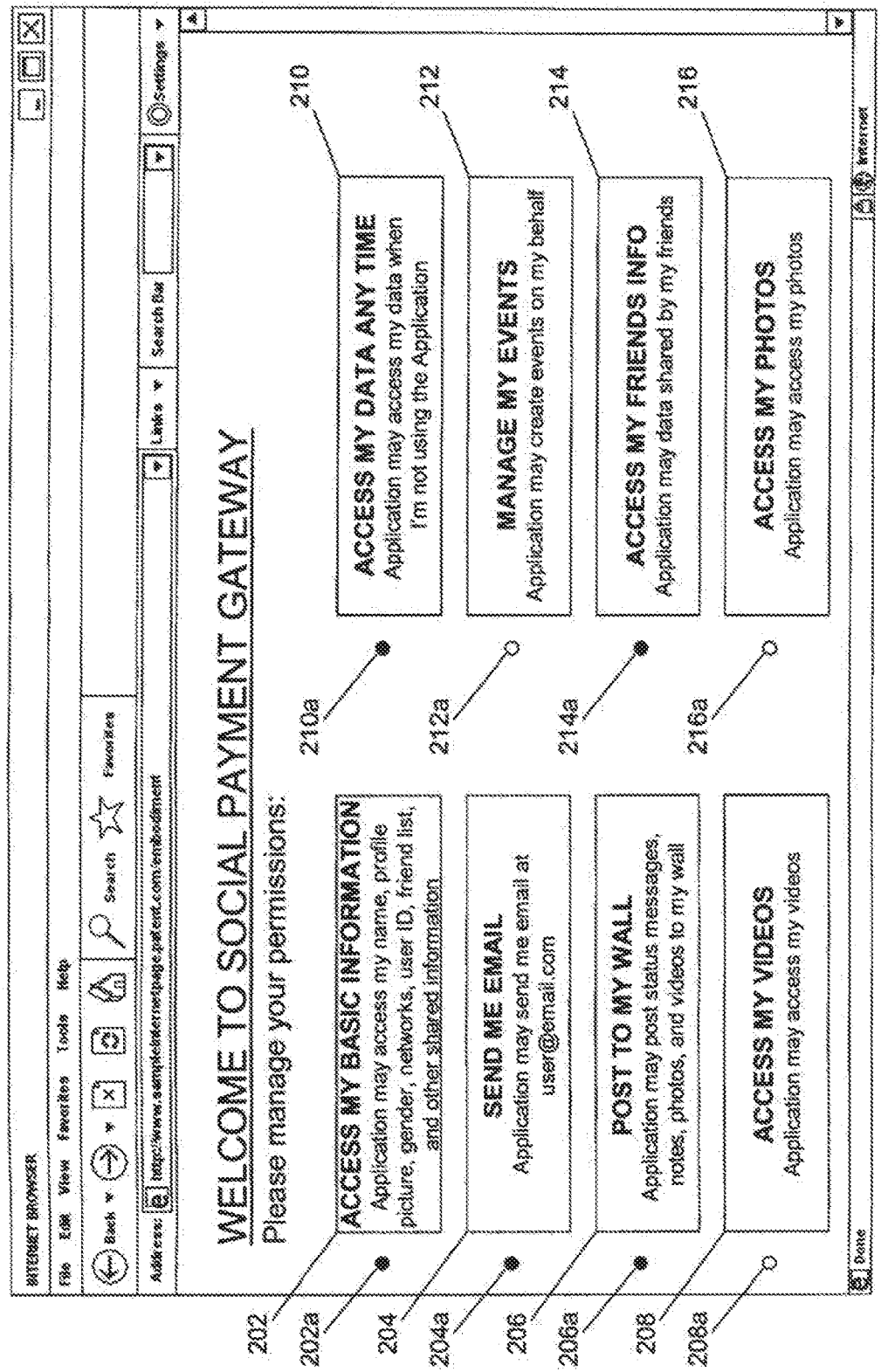
FIG. 2 is a screen shot illustrating an embodiment of a webpage for providing permissions to a payment application.

Referring now to FIG. 2, a permissions webpage 200 is illustrated. In an embodiment, the permissions received at block 102 of the method 100 may be received through the permissions webpage 200, as discussed below. In an embodiment, the permissions webpage 200 may be provided by the social network provider device over a communications network to a user device as part of a social network website for which that user has a user profile. The user may access the permissions webpage 200 upon associating a payment application with their user profile, in an effort to adjust the permissions associated with a payment application associated with their user profile in response to an expired permission, and/or in a variety of other scenarios known in the art. Permissions set on the permissions webpage 200 may result in the social network provider device creating an authorization token and sending that authorization token over the communications network to the social network payment gateway device, and the social network payment gateway device may then associate that authorization token with an identifier for the user in a database.

The permissions webpage 200 includes a basic information access section 202 and associated selector 202*a* that allows a user to select whether the payment application associated with their user profile will be able to access user information such as a user name, a user profile picture, a user gender, networks of the user, a user identification, a friend list of the user, shared information of the user, and/or a variety of other basic user information known in the art. The permissions webpage 200 also includes an email section 204 and associated selector 204*a* that allows a user to select whether the payment application associated with their user profile will be able to send the user email at a designated email address. The permissions webpage 200 also includes a wall section 206 and associated selector 206a that allows a user to select whether the payment application associated with their user profile will be able to post messages, notes, photos, and videos to the user profile 'wall'. The permissions webpage 200 also includes a videos section 208 and associated selector 208a that allows a user to select whether the payment application associated with their user profile will be able to access videos associated with the user profile. The permissions webpage 200 also includes a data access time section 210 and associated selector 210a that allows a user to select whether the payment application associated with their user profile will be able to access data associated with the user profile when the user is not using the payment application. The permissions webpage 200 also includes an event management section 212 and associated selector 212a that allows a user to select whether the payment application associated with their user profile will be able to create events for the user profile. The permissions webpage 200 also includes a friend information access section 214 and associated selector 214a that allows a user to select whether the payment application associated with their user profile will be able to access data shared with the user profile by other users. The permissions webpage 200 also includes a photos section 216 and associated selector 216a that allows a user to select whether the payment application associated with their user profile will be able to access photos associated with the user profile.

In an embodiment, the user may manage the permissions for the payment application may selecting or deselecting the selectors 202a-216a for each of the permission sections 202-216. In an embodiment, any of the permissions in the permission sections 202-216 may be required by the payment application to provide payments between users, and thus the selectors for those permission sections may be automatically selected and not deselectable. For example, as described in further detail below, the payment application may require access to data shared with the user profile by other users, and thus the selector 214a for the friend information access section 214 may be selected and not deselectable. In another example, the payment application may require access to send messages to users whom a payment is being sent.

In an embodiment, in response to receiving the permissions through the permissions webpage 200, the social network provider device may create one or more authorization tokens and send the one or more authorization tokens over the communications network to the social network payment gateway device such that the authorization token(s) may be linked with an identifier of the user and stored in a database. For example, upon receiving a selection of the selector 214a for the friend information access section 214, the social network provider device may mint an OAuth 2.0 access token and send that OAuth 2.0 access token to the social network payment gateway device along with an identifier of the user that provided the permission, and the social network payment gateway device associates and stores the OAuth 2.0 access token and identifier in a database. While an OAuth permissions framework has been provided as an example, one of skill in the art will recognize that a variety of permissions frameworks will fall within the scope of the present disclosure.

In an embodiment, authorization tokens may regularly expire. Thus, authorization tokens that are stored in the database by the social network payment gateway device may be checked each time a payment request is received (discussed in further detail below) and, if the authorization token is expired, the user will be presented with the permissions webpage 200 in order to renew permission such that a valid authorization token exists. In an embodiment, an unexpired authorization token must be provided for each social network that includes users to which a user wants to make payments.

In an embodiment, in order to associate the payment application with their user profile, a user may be required to link the payment application to a payment account that the user has with the payment service provider. In such an embodiment, the user may provide information about the payment account through the communications network (e.g., directly from the user device, from the user device through the social network provider device, etc.) to the social network payment gateway device. The social network payment gateway device may then confirm the user account with the payment service provider device and associate the user account with a payment provider identifier of the user in a database.

In an embodiment, association of the payment application with a user profile for a social network also includes the user providing a user identifier for at least one other social network to which that user belongs. For example, a user may belong to a first social network with which that user has a first user profile, and in associating the payment application with the first user profile, the user provides the payment application an identifier for the user that links the payment application with a second user profile for that user that is on a second social network, an identifier for the user that links the payment application with a third user profile for that user that is on a third social network, etc. In this manner, the payment application associated with a first user profile for a user on a first social network is linked to that users profiles on other social networks. Furthermore, permissions may be provided by the user to the payment application to access data associated with the user profiles for the other social networks (e.g., a user associating a payment application with a first user profile on a first social network may provide permissions for the payment application to access friend data that is shared with the user profiles on the other social networks). Permissions to access data associated with other user profiles on other social networks may be granted by the user through the first user profile on the first social network (e.g., similarly as described above with reference to FIG. 2) and involve authorization tokens, as discussed above. Permissions to access data associated with other user profiles on other social networks may also be granted by the user through the user profile on the other social network (e.g., similarly as described above with reference to FIG. 2) and involve authorization tokens.

While a plurality of permissions have been discussed above, these examples are not meant to be limiting, and one of skill in the art will recognize that a variety of other permissions, authorizations, and/or other user actions may be performed to enable the social network payment system discussed below.

Figure 3:
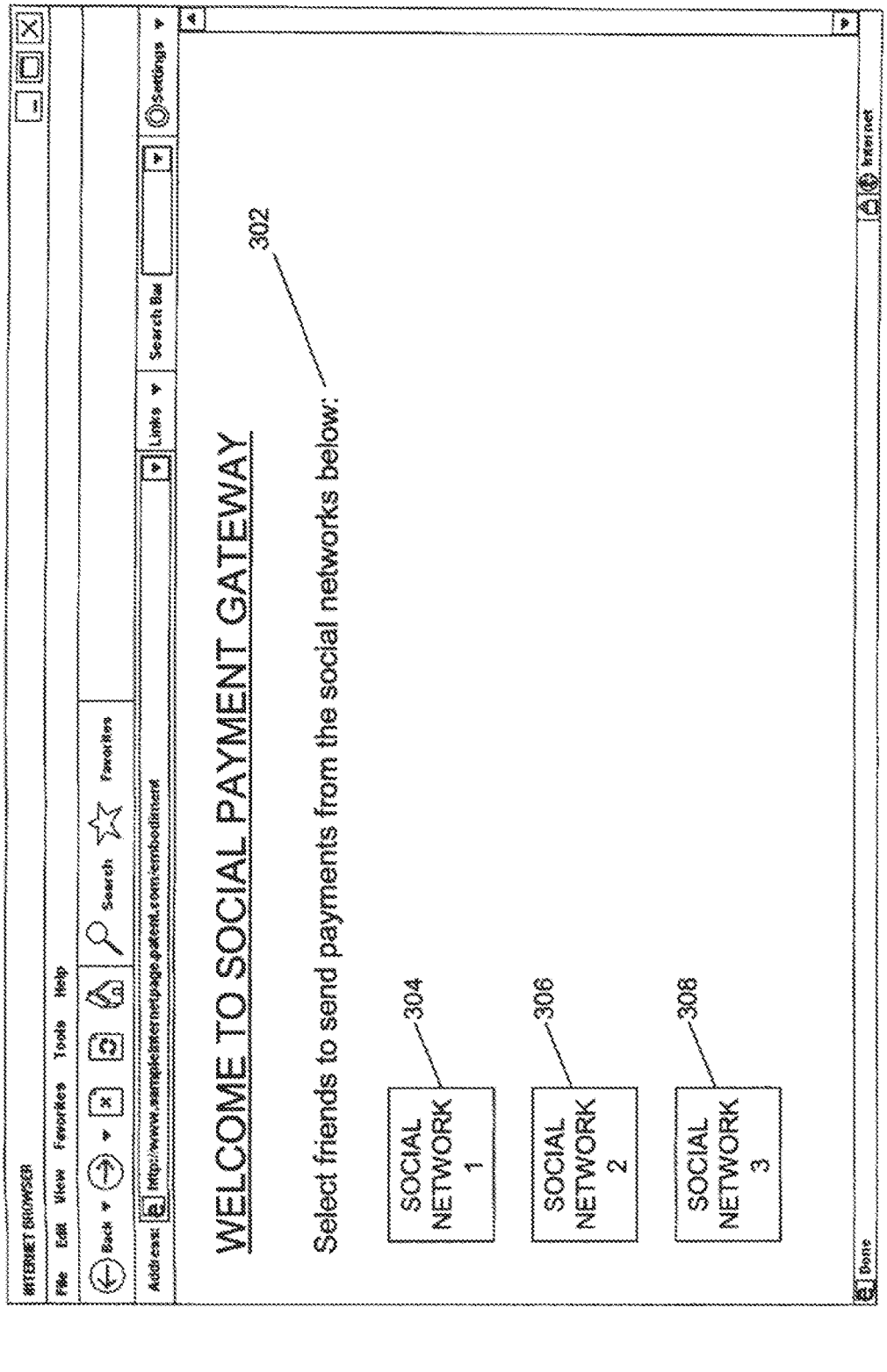
FIG. 3 is a screen shot illustrating an embodiment of a webpage for requesting payments.

Referring now to FIGS. 1, 3, 4, and 5, the method 100 then proceeds to block 104 where a request to may a payment to a payee is received from a payer. FIG. 3 illustrates a payment request web page 300 that may be provided, for example, by the social network provider device over the network to the user device. While a plurality of web pages are illustrated and described below that are typically associated with an Internet browser on a desktop or laptop computer, one of skill in the art will recognize that the web pages may be provided on a phone, tablet, or other highly-mobile device without departing from the scope of the present disclosure. In an embodiment, the payment request web page 300 may be provided to the user device in response to the user of a user device selecting a payment application that is associated with their user profile on a social network. The payment request web page 300 includes a select friends instruction 302, a first social network selector 304, a second social network selector 306, and a third social network selector 308. In an embodiment, the payment application has been associated with the user profile of a user on a social network, and that user has linked the payment application to a first social network (associated with the first social network selector 304), a second social network (associated with the second social network selector 306), and a third social network (associated with the third social network selector 308), each of which the user has a user profile for, as discussed above. Thus, in response to receiving the selection (e.g., from the user device over the network) of the payment application in the user profile, the payment service provider device sends a request to the social network payment gateway device (e.g., along with an identifier of the user selecting the payment application) to retrieve the social networks (e.g., the first, second and third social networks) that are linked in the payment application. In an embodiment, retrieval of the social networks that are linked in the payment application may include retrieving friends (e.g., other users in the retrieved social network that are linked with the user profile for that social network.) Furthermore, the user may use a payment application associated with their user profile in a first social network to designate a payment to another user that is in the first social network. For example, the first social network selector 304 discussed above may be associated with a first social network that is the same social network associated with the user profile that includes the payment application that provides the payment request web pages 300, 400, and 500.

Figure 4:
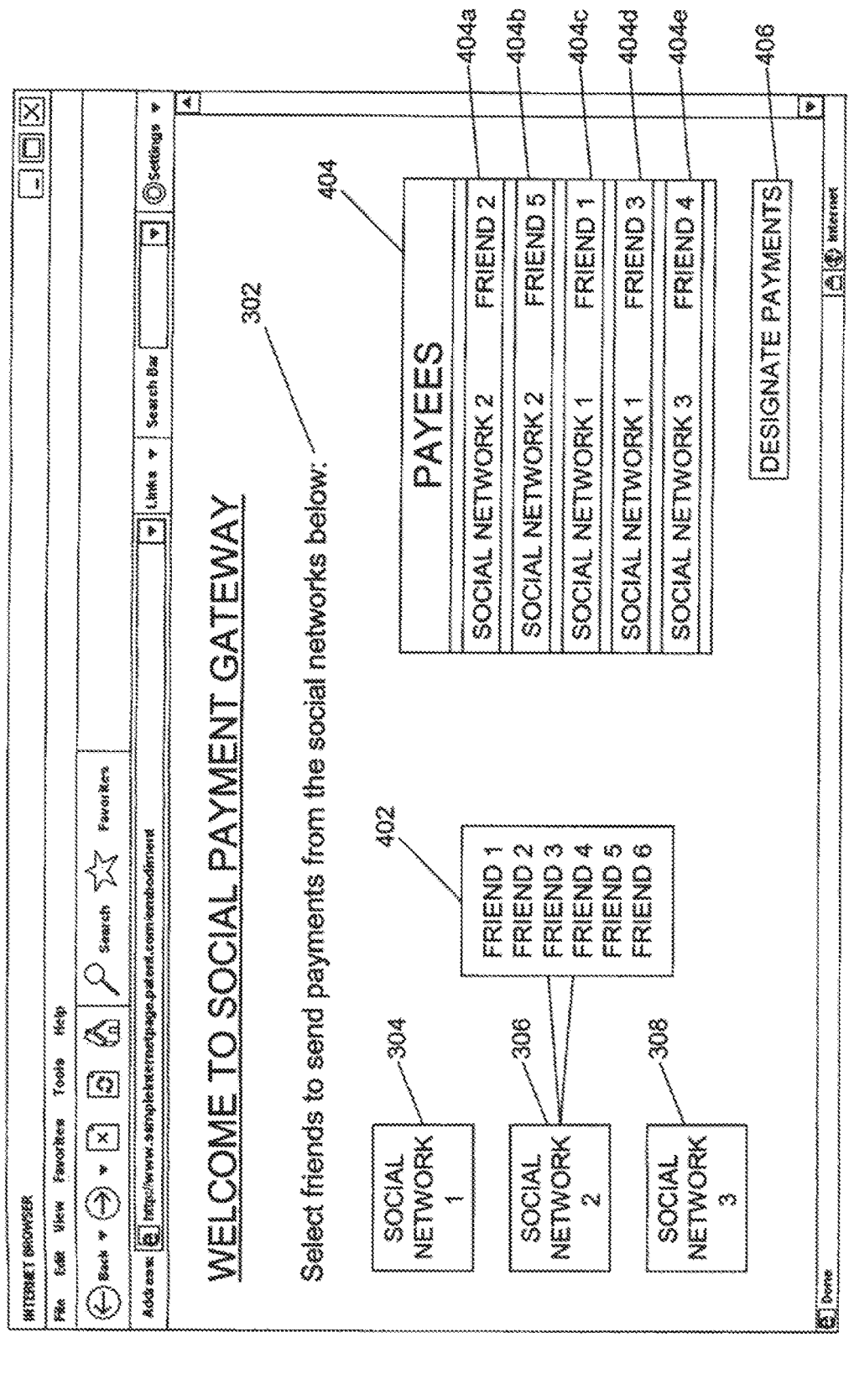
FIG. 4 is a screen shot illustrating an embodiment of a webpage for requesting payments.

Referring now to FIG. 4, a payment request web page 400 may be provided, for example, by the social network provider device over the network to the user device, upon the user selecting the second social network selector 306 on the payment request web page 300. For example, the user may 'mouse-over' the second social network selector 306 in order to be provided a friend list 402. As discussed above, the social network payment gateway device may provide the social network provider device the friends associated with each user profile for each of the social networks that the user has linked with the payment application. In another embodiment, selecting one of the social network selectors 304, 306, and/or 308 may result in the social network provider device retrieving the friend list for the associated social network. In an embodiment, every friend associated with a user profile for a social network may be provided in the friend list when the associated social network selector is selected. In another embodiment, only friends who have shared certain data with the user profile for a social network may be provided in the friend list when the associated social network selector is selected. For example, particular information may be required to send a payment to a friend such as, for example, an email address, a phone number, and/or a variety of other contact information known in the art, and thus only friends that share such contact information with the user profile being used to request a payment may be included in a friend list. Additionally, an authorization token may be required for the social network payment system to determine that friends have shared such contact information with the user profile. In an embodiment, the friend list 402 may be searchable.

Thus, the payment request web page 400 may provide the user a friend list like the friend list 402 in response to the user selecting any of the first social network selector 304, the second social network selector 306, and/or the third social network selector 308. The user may then select friends from the friend lists in order to populate a payee list 404. In the illustrated embodiment, the user has populated the payee list 404 with a plurality of payees 404a and 404b selected from the second social network, a plurality of payees 404c and 404d selected from the first social network, and a payee 404e selected from the third social network. One of skill in the art will recognize that one or more payees may be selected by the user in the manner described above in order to send a payment to that payee, as described in further detail below. When the user has selected all the friends that the user wishes to make a payment to, the user may select a 'designate payments' button 406.

Figure 5:
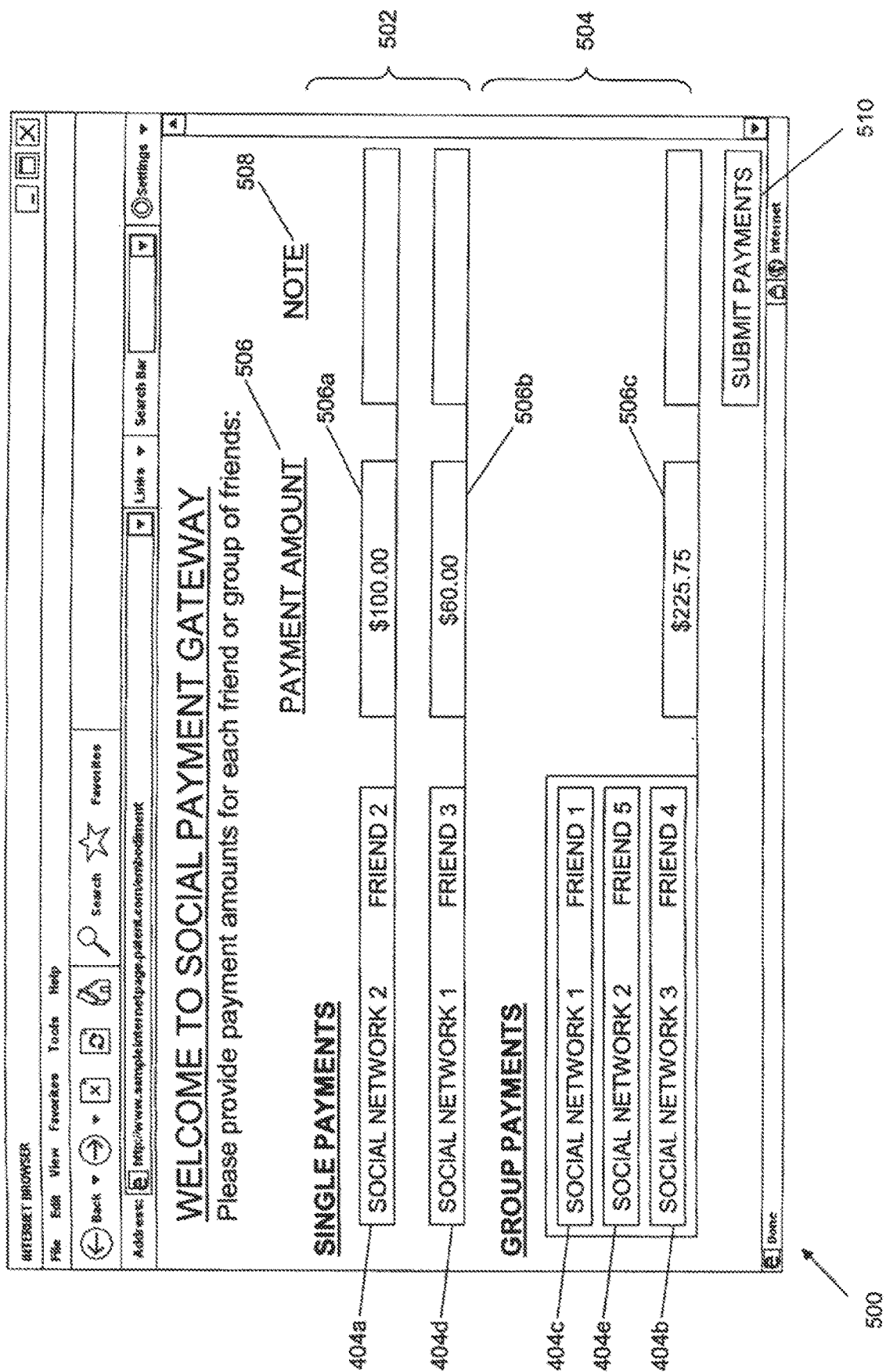
FIG. 5 is a screen shot illustrating an embodiment of a webpage for requesting payments.

Referring now to FIG. 5, a payment request web page 500 may be provided, for example, by the social network provider device over the network to the user device upon the user selecting the 'designate payments' button 406 on the payment request web page 400. The payment request web page 500 includes a single payments section 502 and a group payments section 504. Each of the single payments section 502 and the group payments section 504 includes a payment amount area 506 and a note area 508. In an embodiment, the user may select the friends populated in the payee list 404 on the payment request web page 400 and designate each friend for a single payment in the single payment section 502, a group payment in the group payment section 502, and/or both. For example, in the payment request web page 500, the user may 'drag and drop' each of the friends that were populated in the payee list 404 on the payment request web page 400 into the single payment section 502 and the group payment section 504 such that the payees 404a and 404d are designated for single payments, and the payees 404c, 404e, and 404b are designated for a group payment, as illustrated. The user may then provide a payment amount for each designated payment, such as the payment amount 506a for the single payment ($100.00) to the payee 404a, the payment amount 506b for the single payment ($60.00) to the payee 404d, and the payment amount 506c for the group payment ($225.75) to the payees 404c, 404e, and 404b. While not illustrated, one of skill in the art will recognize that a note may be provided along with any of the payment amounts 506a, 506b, and 506c in the note section 508 associated with that payment amount.

While a specific example has been provided that illustrates a plurality of single payments and a group payment, one of skill in the art will recognize that any payments may be made such as, for example, a single payment to a single payee, multiple group payments to a plurality of different and/or common payees, and/or a variety of other payment scenarios known in the art. Thus, a user may select one or more users from a plurality of different social networks and designate a payment amount to be paid to those one or more users. Once all the payment amounts have been designated, the user may select a submit payments button 510 in order to provide a request to make the designated payment to the payees 404a, 404b, 404c, 404d, and 404e. The request to make the payment may be provided from the user device to the social network provider device over the network.

Referring back to FIG. 1, the method 100 then proceeds to block 106, where an identifier and authorization token associated with a payer are determined. In an embodiment, upon receiving the request to make the payment, the social network provider device sends the request to make the payment along with identifiers for the payer (i.e., the user making the payment(s)) and the payees (i.e., the users to which the payment(s) are being made) to the social network payment gateway device over the network. The social network payment gateway device accesses a database and uses the identifier for the payer to determine that the identifier for the payer is associated with a payment provider identifier and at least one authorization token. As discussed above, the payment provider identifier for the payer indicates that the payer includes a user account with the payment provider, and the at least one authorization token is associated with the payer in response to the payer giving permission to the payment application to access data associated with user profiles in one or more social networks. For example, the authorization token may provide permission to access data shared by the payees with the user profile(s) of the payer, as discussed above.

The method 100 then proceeds to block 108 where an authorization token is used to retrieve a payment service provider identifier for a payee. Depending on the status of the payee with the payment service provider, the retrieval of the payee's payment service provider identifier may occur in a number of different ways. For example, a payee may either have an account with the payment service provider, or the payee may not have an account with the payment service provider. The remainder of the method 100 will now be described with regard to payees that have accounts with the payment service provider, followed by a description of how the method 100 operates in the event the payee does not have an account with the payment service provider.

In an embodiment, the payee includes an account with the payment service provider, and the social network payment gateway device may send a request for payee information over the network to the social network provider device to which the payee belongs. For example, the social network payment gateway device may send an authorization token (provided previously by the payer) along with the identifier for the payee (which may simply include the name of the payee) to the social network of the payee (e.g., the social network from which the payee was selected on the payment request web page 400) in order to request information about the payee. As discussed above, the payer includes a user profile for the social network in which the payee belong, and the authorization token gives permission for the social network provider device to allow the social network payment gateway device to access data shared with the user profile of the payer. Thus, information about the payee may be retrieved by the social network payment gateway device. In an embodiment, the information about the payee is that is retrieved by the social network payment gateway device includes an email address for the payee, a phone number for the payee, and/or a variety of other payee information known in the art. In an embodiment, the retrieved information about the payee may be any information that is unique to the payee and leaves no ambiguity about who the payee is The social network payment gateway device may then use the retrieved information about the payee to determine that the payee includes an account with the payment service provider. For example, the social network payment gateway device may send the information about the payee (e.g., an email address) to the payment service provider device, and the payment service provider device may determine that the information about the payee corresponds to an account held by the payee with the payment service provider. A payment service provider identifier for the payee may then be provided to the social network payment gateway device. In another embodiment, the payment service provider identifier for the payee may already be stored in a database that is coupled to the social network payment gateway device, and the social network payment gateway device may simply retrieve the payment service provider identifier from that database. Thus, for each payee designated in the request to make the payment by the payer, a payment service provider identifier may be retrieved by the social network payment gateway device.

The method 100 then proceeds to block 110 where instructions are transmitted to make the payment(s) from the payer to the payee(s). In an embodiment, the social network payment gateway device uses the payment service provider identifiers for the payer and the payees that were determined and/or retrieved in blocks 106 and 108 of the method 100 to transmit an instruction over the network to the payment service provider device to make a payment(s) from the payer to the payee(s). In an embodiment, the instructions to make the payment(s) includes the payment service provider identifier for the payer, the payment service provider identifier(s) for the payees, the payment amount for each payee, any notes associated with payment amounts for each payee, and/or a variety of other payment information known in the art.

The method 100 then proceeds to blocks 112 and 114 where a payment alert is adapted for the social network of the payee, and that payment alert is sent to the payee via the social network. In an embodiment, the social network payment gateway device includes adapters that are operable to adapt a payment alert for each social network to which a payment may be made. As is know in the art, messaging infrastructures for social networks may be different in that they may include different formats and may follow different protocols. For example, social networks may provide messaging through 'wall postings", notifications, private messaging, using systems that act like email clients, and/or a variety of other messaging formats and/or protocols known in the art. In an embodiment, the adapters included in the social network payment gateway device are operable to adapt a payment alert and/or message such that it will be in the proper format and/or protocol for the social network to which it is being sent.

Figure 6:
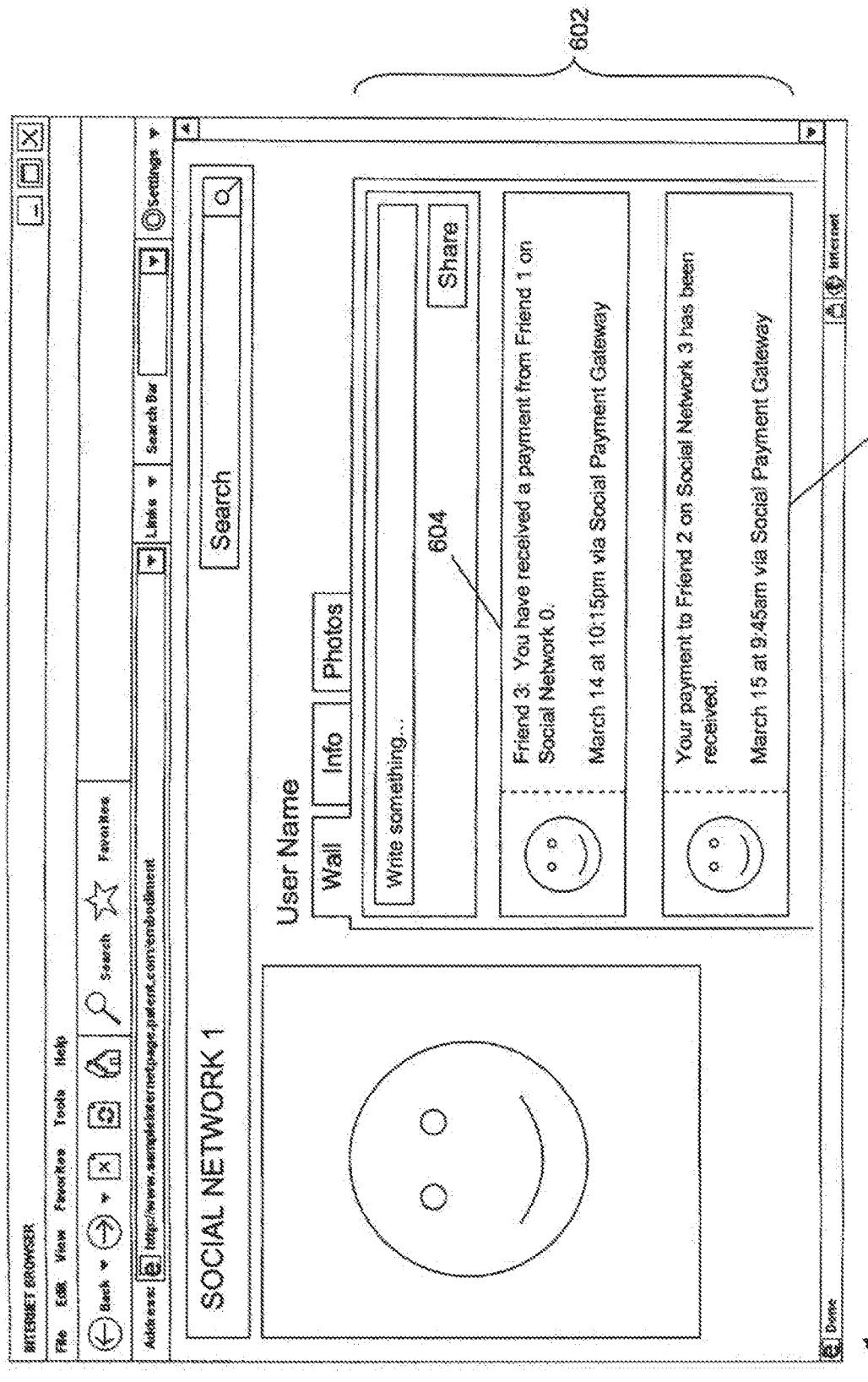
FIG. 6 is a is a screen shot illustrating an embodiment of a webpage for providing a payment alert and payment confirmation.

For example, FIG. 6 illustrates a user profile web page 600 that may be provided by a social network provider device over a network to a user on a user device in response to the social network payment gateway device sending an payment alert to the payee through their social network. The user profile web page 600 includes a 'wall' 602 illustrating a payment alert 604. For each payee designated by the payer for a payment in block 104 of the method 100, the social network payment gateway device may adapt a payment alert for the social network to which that payee belongs (e.g., the social network from which that payee was selected to populate the payee list 404 in block 104.) In the embodiment illustrated in FIG. 6, the first social network of the payee receiving the payment alert provides messaging through 'wall postings', and thus an adapter in the social network payment gateway device has adapted a payment alert to create the payment alert 604 on the wall 602 of the user profile web page 600. The payment alert 604 includes a description that indicates that a payment has been received from a user ("Friend 1") on a social network ("Social Network 0"). One of skill in the art will recognize that the payment alert may be provided in a notification, through a private message, through an email, and/or using any other messaging format and/or protocol that is implemented in the social network of the payee.

In one embodiment, the payee may select the payment alert 604 to accept the payment. For example, in response to the user selecting the payment alert and sending an instruction to accept the payment from the user device to the social network provider device over the network, the social network provider device may forward the acceptance over the network to the payment service provider device. In response to receiving the acceptance of the payment, the payment service provider device may complete the payment by sending instructions to a financial account holder to transfer funds from an account of the payer to an account of the payee. Upon a completed payment, the payment service provider device may inform the social network payment gateway device that the payment has been completed, and the social network payment gateway device may use the adapters to adapt a payment confirmation for the social network of the payer and then send that payment confirmation to the payer. For example, the user profile web page 600 illustrates a payment confirmation 606 that was send to the user in the first social network upon another user ("Friend 2") in a social network ("Social Network 3") accepting and receiving a payment from the user. Thus, as can be seen by the discussion above, payments may be sent and received by users of social networks without the users having to leave their social network website.

In another embodiment of the method 100, the payee may not have an account with the payment service provider, and thus there may initially be no payment service provider identifier associated with the payee. For example, at block 108 of the method 100, the information about the payee that is retrieved by the social network payment gateway device may indicate that the payee does not include an account with the payment service provider. In such an embodiment, the retrieved information of the payee may then be used to send a payment alert to the payee substantially as described above with reference to blocks 112 and 114 of the method 100. However, in an embodiment, the retrieved information of the payee may not be, for example, an email address or phone number as discussed above, and thus such information may need to be retrieved by the social network payment gateway device. As discussed above, the social network payment gateway device includes adapters that allow the social network payment gateway device to adapt a payment alert such that it may be provided on a variety of different social networks to which a payee may belong. Thus, the payment alert 604 on the user profile web page 600 illustrated in FIG. 6 may be provided by a social network provider device over a network to a user on a user device in response to the social network payment gateway device determining that the payee does not have an account with the payment service provider.

In this embodiment, in response to the payee selecting the payment alert 602, the payee is required to create an account with the payment service provider in order to receive the payment provided by the payer. For example, the payee may be required to create an payment account with the payment service provider and link a financial account (e.g., a checking account, a savings account, a credit account, etc.) with the payment account, as is know in the art. In an embodiment, creating a payment account with the payment service provider may include providing an email address and/or phone number to the payment service provider. Upon creating the payment account, the method 100 may proceed to block 110 where the instruction to make the payment from the payer to the payee is performed. In this embodiment, because the payment alert was adapted and sent between blocks 108 and 110 of the method 100 in order to retrieve the payment service provider identifier for the payee (e.g., by requiring the payee to create the payment service provider account), blocks 112 and 114 of the method 100 are included between blocks 108 and 110 rather than following block 110 as illustrated in FIG. 1.

In an embodiment, a group payment (e.g., the group payment discussed above with reference to FIG. 5) must be accepted by all of the payees in order for the payment to be initiated by the payment service provider. Thus, the payment service provider device may not complete a group payment from a payer to a plurality of payees until a plurality of acceptances are received (e.g., from the user devices through the social network provider devices over the network.) However if some payees do not accept the payment or do not have accounts with the payment service provider, the payer may be given the option to initiate the payment to the payees that have currently accepted the payment. Thus, for example, if payees 404c and 404e have accepted the payment and the payee 404b has not yet accepted the payment, the payer may send instructions (e.g., using the payment application through the user profile) to initiate the payment to payees 404c and 404e (e.g., $75.25 each in the illustrated embodiment), and then provide the remainder of the group payment to the payee 404b when that payee accepts the payment.

Thus, a system and method have been described that allow a payer user to send payments to one or more payee users within one or across multiple social networks without disturbing the social network experience of either of the payer user or the payee users. The payer user simply needs to select payees users from one or more of their social network, while remaining within one of those social networks, and designate the payment amounts for each of the payee users. Furthermore, the payee user must simply accept the payment through a payment alert in order to have payment transferred to one of their financial accounts from one of the payer's financial accounts.

Figure 7:
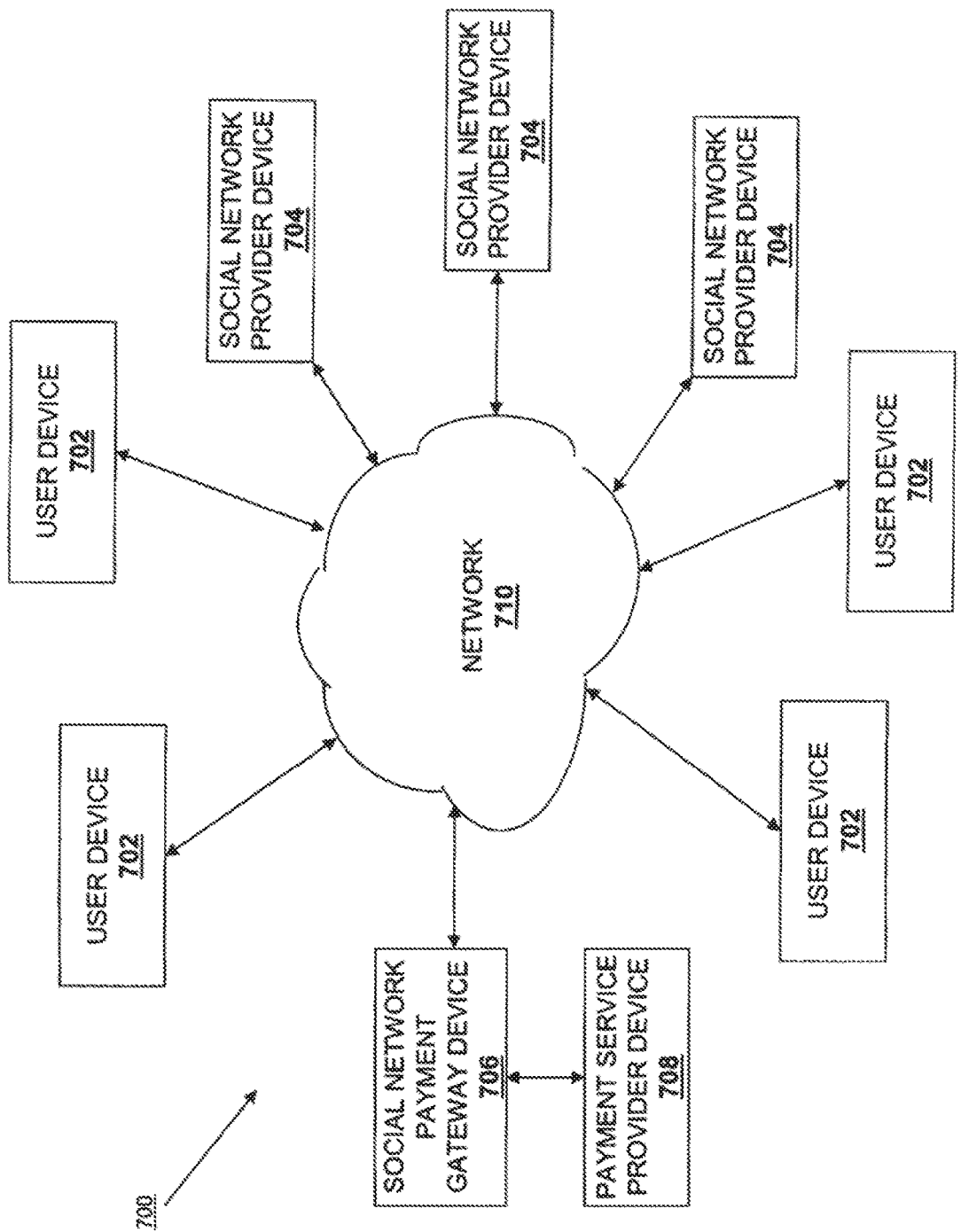
FIG. 7 is a schematic view illustrating an embodiment of a networked system.

Referring now to FIG. 7, an embodiment of a networked system 700 used in the social network payment system described above is illustrated. The networked system 700 includes a plurality of user devices 702, a plurality of social network provider devices 704, a social network payment gateway device 706, and a payment service provider device 708 in communication over a communications network 710. Any of the user devices 702 may be the user devices operated by any of the users discussed above. The social network provider devices 704 may be the social network provider devices operated by the social network providers discussed above. The payment service provider device 708 may be the payment service provider device discussed above and may be operated by a payment service provider such as, for example, PayPal Inc. of San Jose, CA. The social network payment gateway device 706 may be the social network payment gateway device discussed above, and may be operated by a third party (e.g., a party other than the users, the social network providers, and the payment service provider), by a social network provider, and/or by the payment service provider. While not illustrated, account provider devices may be coupled to the network 710 and accessed by the payment service provider device 708 to process a payment from a payer to a payee, as discussed above, and may be operated by account providers such as, for example, credit card account providers, bank account providers, savings account providers, and a variety of other account providers known in the art.

The user devices 702, social network provider devices 704, social network payment gateway device 706, payment service provider device 708, and account provider devices may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 710.

The network 710 may be implemented as a single network or a combination of multiple networks. For example, in various embodiments, the network 710 may include the Internet and/or one or more intranets, landline networks, wireless networks, and/or other appropriate types of networks.

The user devices 702 may be implemented using any appropriate combination of hardware and/or software configured for wired and/or wireless communication over network 710. For example, in one embodiment, the user devices 702 may be implemented as a personal computer of a user in communication with the Internet. In other embodiments, the user devices 702 may be a smart phone, personal digital assistant (PDA), laptop computer, and/or other types of computing devices.

The user devices 702 may include one or more browser applications which may be used, for example, to provide a convenient interface to permit the payer to browse information available over the network 710. For example, in one embodiment, the browser application may be implemented as a web browser configured to view information available over the Internet.

The user devices 702 may also include one or more toolbar applications which may be used, for example, to provide user-side processing for performing desired tasks in response to operations selected by the payer. In one embodiment, the toolbar application may display a user interface in connection with the browser application.

The user devices 702 and/or the social network provider devices 704 may further include other applications as may be desired in particular embodiments to provide desired features to the user devices 702. In particular, the other applications may include a payment application for payments assisted by a payment service provider through the social network payment gateway device 706 and the payment service provider device 708. The other applications may also include security applications for implementing user-side security features, programmatic user applications for interfacing with appropriate application programming interfaces (APIs) over the network 710, or other types of applications. Email and/or text applications may also be included, which allow the payer to send and receive emails and/or text messages through the network 710. The user devices 702 include one or more user and/or device identifiers which may be implemented, for example, as operating system registry entries, cookies associated with the browser application, identifiers associated with hardware of the user devices 702, or other appropriate identifiers, such as a phone number. In one embodiment, the user identifier may be used by the social network provider device 704, the social network payment gateway device 706, and/or the payment service provider device 708 to associate the user with a particular account as further described herein.

Figure 8:
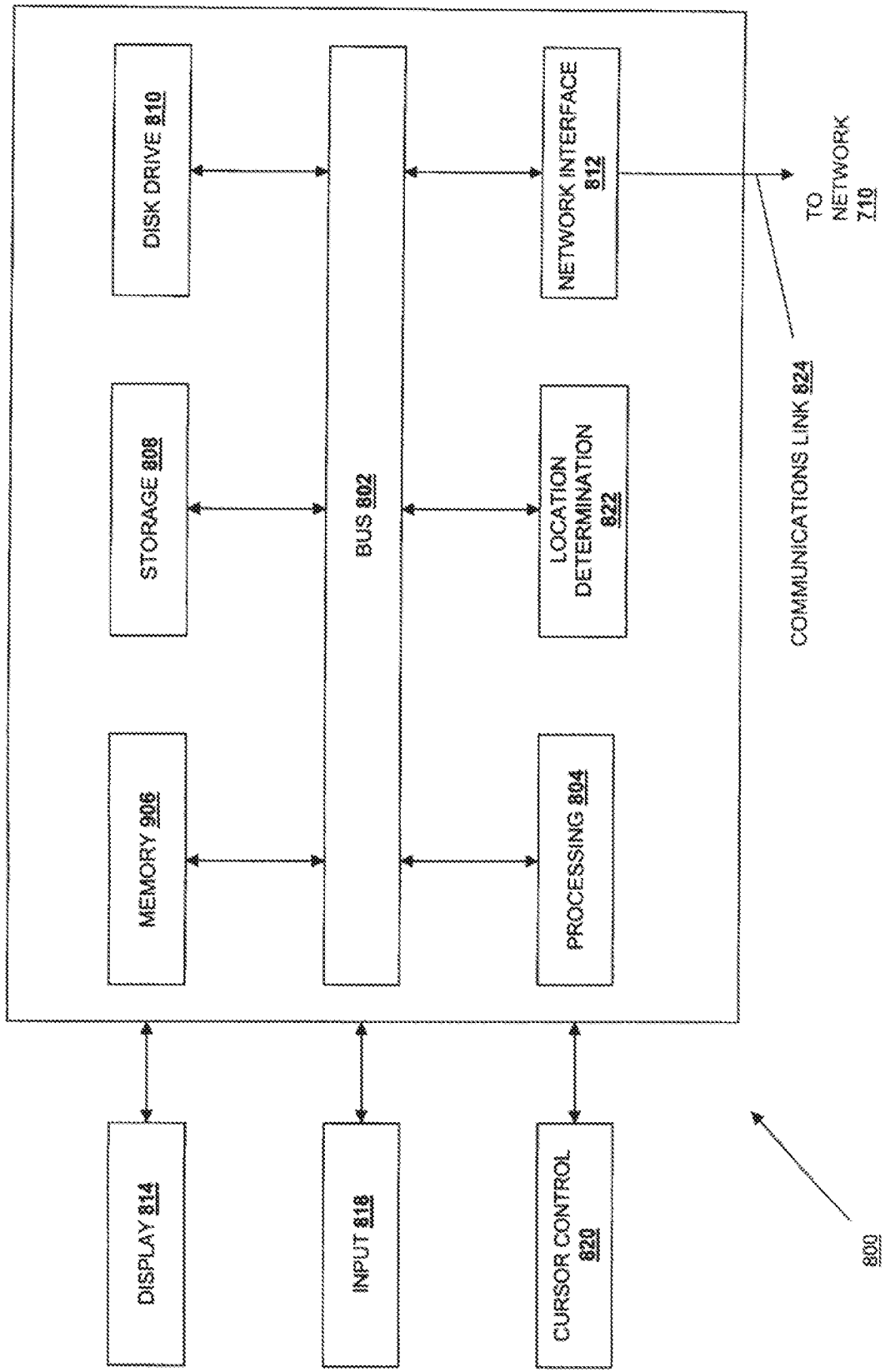
FIG. 8 is a schematic view illustrating an embodiment of a computer system.

Referring now to FIG. 8, an embodiment of a computer system 800 suitable for implementing, for example, the user devices 702, the social network provider devices 704, the social network payment gateway device 706, the payment service provider device 708, and/or the account provider devices, is illustrated. It should be appreciated that other devices utilized by payer, payees, payment service providers, and account providers in the payment system discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), and/or a cursor control component 820 (e.g., mouse, pointer, or trackball). In one implementation, the disk drive component 810 may comprise a database having one or more disk drive components.

In accordance with embodiments of the present disclosure, the computer system 800 performs specific operations by the processor 804 executing one or more sequences of instructions contained in the memory component 806, such as described herein with respect to the user devices 702, the social network provider devices 704, the social network payment gateway device 706, the payment service provider device 706, and/or the account provider devices. Such instructions may be read into the system memory component 806 from another computer readable medium, such as the static storage component 808 or the disk drive component 810. In other embodiments, hard-wired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 710 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Figure 9:
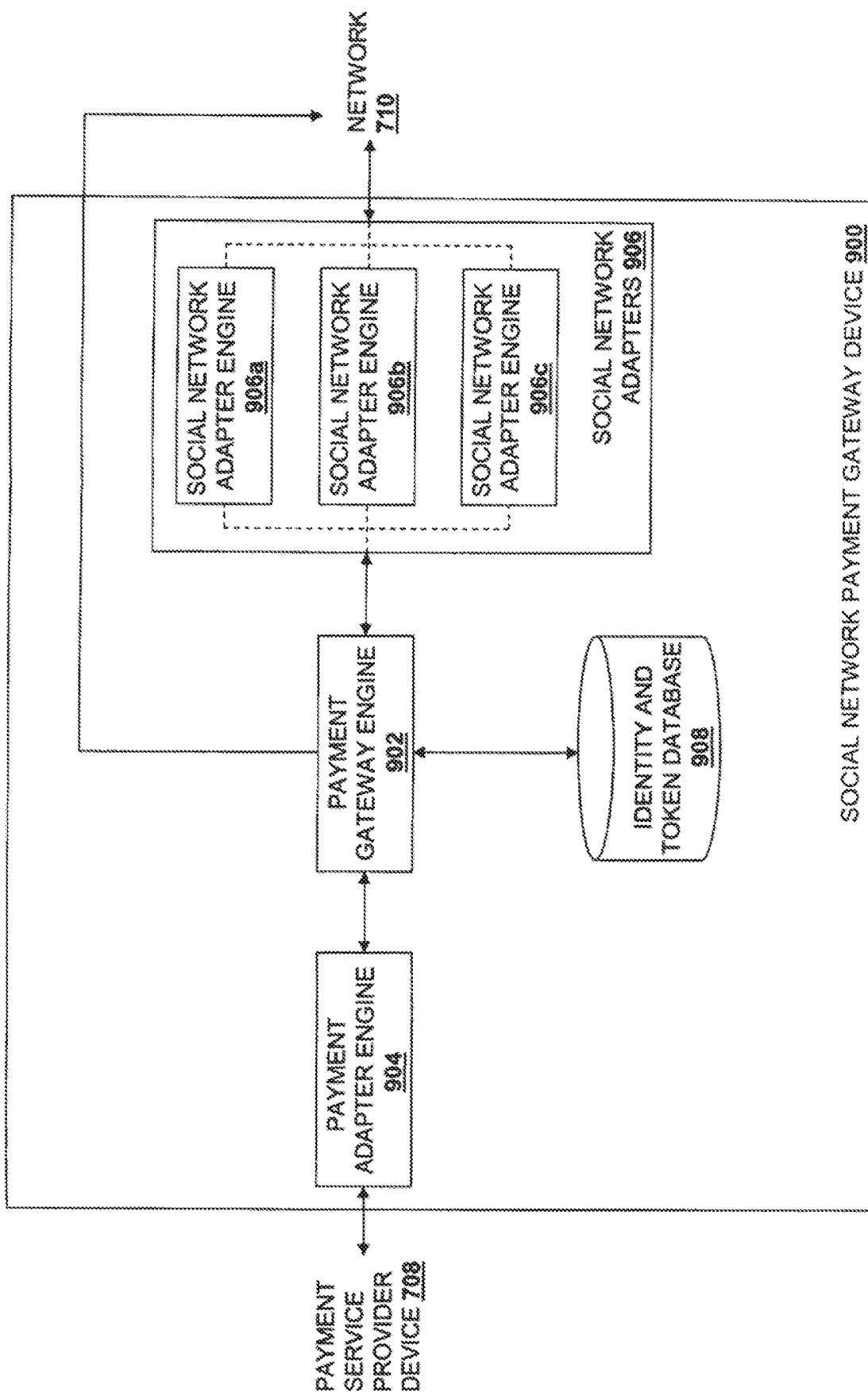
FIG. 9 is a schematic view illustrating an embodiment of a social network payment gateway device.

Referring now to FIG. 9, an embodiment of a social network payment gateway device 900 is illustrated. In an embodiment, the social network payment gateway device 900 may be the social network payment gateway device 706. The social network payment gateway device 900 includes a payment gateway engine 902 that is coupled to a payment adapter engine 904, a plurality of social network adapters 906, an identity and token database 908, and the network 710. The payment adapter engine 904 is coupled to the payment service provider device 708. The plurality of social network adapters 906 are coupled to the network 710 and include a first social network adapter engine 906a, a second social network adapter engine 906b, and a third social network adapter engine 906c. The payment gateway engine 902 may be software or instructions stored on a computer-readable medium that allows the social network payment gateway device 900 to send, receive, and retrieve information between the various components of the social network payment gateway device 900 and the network 710. The payment adapter engine 904 may be software or instructions stored on a computer-readable medium that is operable to receive a payment request and its associated information from the payment gateway engine 902, generate a payment instructions, send the payment instructions to the payment service provider device 708, and receive and transmit information from the payment service provider device to the payment gateway engine 902. Each social network adapter engine 906a, 906b, and 906c may be software or instructions stored on a computer-readable medium that is operable to adapt a payment alert to the correct format and/or protocol for a social network. For example, the social network adapter engine 906a may be a OpenGraph Application Programming Interface (API) adapter that is operable to adapt payment alerts for a social network provided by FACEBOOK®. In another example, the social network adapter engine 906b may be an Open Social Representational State Transfer (REST) API adapter that is operable to adapt payment alerts for a social network provided by LINKEDIN®. In another example, the social network adapter engine 906c may be a REST API adapter that is operable to adapt payment alerts for a social network provided by MYSPACE®. While a plurality of social network adapter engines have been described, one of skill in the art will recognize that a variety of other social network adapters may be provided for a variety of other social network API protocols known in the art without departing from the scope of the present disclosure. The identity and token database 908 may be a conventional database known in the art and may hold the identifiers and authorization tokens discussed above. While the identity and token database 908 has been illustrated as located in the social network payment gateway device 900, one of skill in the art will recognize that it may be connected to the payment gateway engine 902 through the network 710 without departing from the scope of the present disclosure.

Figure 10:
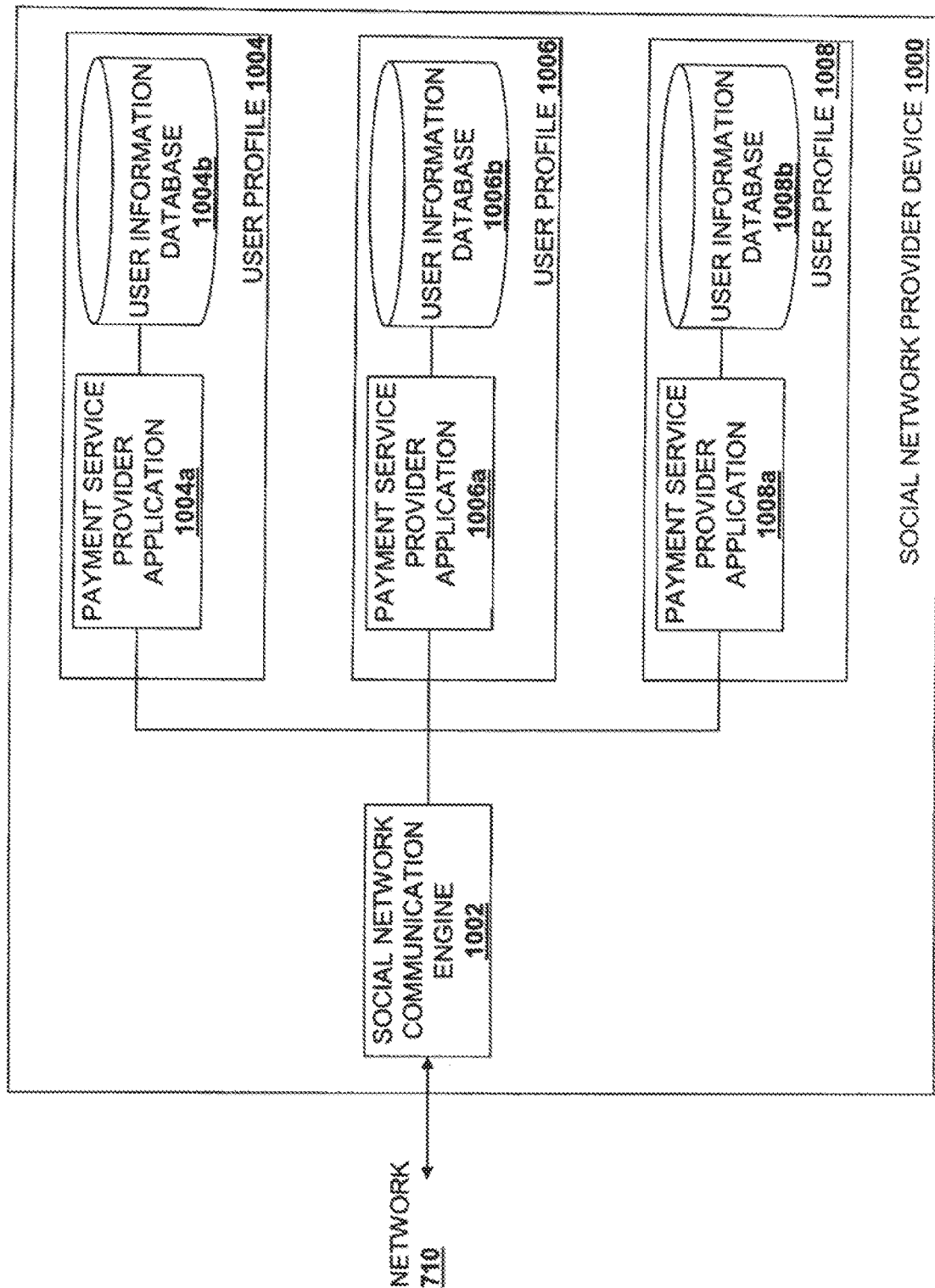
FIG. 10 is a schematic view illustrating an embodiment of a social network provider device.

Referring now to FIG. 10, an embodiment of a social network provider device 1000 is illustrated. In an embodiment, the social network provider device 1000 may be the social network provider device 704. The social network provider device 1000 includes a social network communication engine 1002 that is coupled to a plurality of user profiles 1004, 1006, and 1008. Each user profile 1004, 1006, and 1008 is associated with a payment service provider application 1004a, 1006a, and 1008a, respectively, and a user information database 1004b, 1006b, and 1008b, respectively. The social network communication engine 1002 may be software or instructions stored on a computer-readable medium that allows the social network provider device 1000 to send and receive information over the network 710. The payment service provider applications 1004a, 1006a, and 1008a may be software or instructions stored on a computer-readable medium that are operable to perform the functionality of the payment application that is associated with a user profile on a social network, as discussed above. The user information databases 1004b, 1006b, and 1008b may be conventional databases known in the art and may hold any or all information associated with the user profiles 1004, 1006, and 1008, respectively. While a separate user information database 1004b, 1006b, and 1008b has been illustrated as provided for each user profile 1004, 1006 and 1008, one of skill in the art will recognize that the user information databases 1004b, 1006b, and 1008b may be part of a single database or any number of databases. While the user information databases have been illustrated as located in the social network provider device 1000, one of skill in the art will recognize that they may be connected to the user profiles 1004, 1006, and 1008 through the network 710 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions form the non-transitory memory to cause the system to perform operations comprising:
    detecting, from a first social network corresponding to a first user, an input made via a user interface provided by the first social network in an application linked to the first social network and a first account associated with the first user, wherein the input corresponds to a payment from the first user of the first social network to a second user of a second social network, and wherein the first social network is different from the second social network;
    in response to detecting the input corresponding to the payment, referencing a database for a first payment identifier and a first authorization token corresponding to the first user, wherein the first authorization token is associated with an application permission granted to the application by the first user that allows the application to access and post data on the first social network and the second social network;
    in response to determining that the first user corresponds to the first authorization token:
        determining that the application is permitted to access profile data for the second user from the second social network based on the application permission associated with the first authorization token,
        determining, based on the application permission, the profile data for the second user from social network data accessible on the second social network, and
        obtaining, based on the profile data, a second payment identifier associated with the second user from the second social network;
    causing, through the first social network, a payment to be made from the first account to a second account associated with the second user based at least on the second payment identifier and the profile data, wherein the first account corresponds to the first social network and the second account corresponds to the second social network;
    generating a payment alert for the payment on the first social network;
    determining a message adapter at a gateway device for the second social network, wherein the message adapter is configured to adapt the payment alert to a social messaging protocol utilized by the second social network for messaging between users;
    authenticating the system with the gateway device using the first authorization token, wherein the authenticating authorizes the message adapter to adapt the payment alert to the second social network on behalf of the system;
    adapting the payment alert for the second social network using a messaging format for the social messaging protocol; and
    posting the adapted payment alert in a social message to the second user via the second account based on the adapted payment alert and the social messaging protocol.

2. The system of claim 1, wherein the first authorization token is further associated with a payment permission from the first user to provide the payment to the second account of the second user.

3. The system of claim 2, wherein the application permission from the first user permits the application to access user data associated with one or more user profiles of the first user on the first social network or the second social network or social post data shared by the second user with the first user on the first social network or the second social network.

4. The system of claim 1, wherein the first authorization token corresponds to a permission provided by the second user that allows the application to obtain at least one of the profile data or the second payment identifier from the second social network.

5. The system of claim 1, the operations further comprise:
    receiving, via a permissions user interface, information corresponding to the application permission provided by the first user; and
    in response to receiving the information corresponding to the first permission, creating the first authorization token based on the application permission.

6. The system of claim 1, wherein the detecting the input corresponding to the payment from the first user to the second user includes detecting a selection of a selectable element provided in the user interface, wherein the selectable element corresponds to the second user.

7. The system of claim 1, wherein the payment is processed by a payment provider, and wherein the application comprises one of a browser application or a payment application corresponding to the payment provider.

8. A method, comprising:
    detecting, from a first social network corresponding to a first user, an input made via a user interface provided by the first social network in an application linked to the first social network and a first account associated with the first user, wherein the input corresponds to a payment from the first user of the first social network to a second user of a second social network, and wherein the first social network is different from the second social network;
    in response to detecting the input corresponding to the payment, referencing a database for a first payment identifier and a first authorization token corresponding to the first user, wherein the first authorization token is associated with an application permission granted to the application by the first user that allows the application to access and post data on the first social network and the second social network;
    determining that the application is permitted to access profile data for the second user from the second social network based on the application permission associated with the first authorization token,
    determining, based on the application permission, the profile data for the second user from social network data accessible on the second social network, and
    obtaining, based on the profile data, a second payment identifier associated with the second user from the second social network;

causing, through the first social network, a payment to be made from the first account to a second account associated with the second user based at least on the second payment identifier and the profile data, wherein the first account corresponds to the first social network and the second account corresponds to the second social network;

generating a payment alert for the payment on the first social network;

authenticating with a gateway device using the first authorization token, wherein the authenticating authorizes a message adapter to adapt the payment alert to the second social network using a social messaging protocol utilized by the second social network;

generating an adapted payment alert for the second social network using a messaging format for the social messaging protocol; and posting the adapted payment alert in a social message to the second user via the second account based on the adapted payment alert and the social messaging protocol.

9. The method of claim 8, wherein the first authorization token is further associated with a payment permission from the first user to provide the payment to the second account of the second user.

10. The method of claim 9, wherein the application permission from the first user permits the application to access user data associated with one or more user profiles of the first user on the first social network or the second social network or social post data shared by the second user with the first user on the first social network or the second social network.

11. The method of claim 8, wherein the first authorization token corresponds to a permission provided by the second user that allows the application to obtain at least one of the profile data or the second payment identifier from the second social network.

12. The method of claim 8, further comprising:
receiving, via a permissions user interface, information corresponding to the application permission provided by the first user; and
in response to receiving the information corresponding to the first permission, creating the first authorization token based on the application permission.

13. The method of claim 8, wherein the detecting the input corresponding to the payment from the first user to the second user includes detecting a selection of a selectable element provided in the user interface, wherein the selectable element corresponds to the second user.

14. The method of claim 8, wherein the payment is processed by a payment provider, and wherein the application comprises one of a browser application or a payment application corresponding to the payment provider.

15. A non-transitory machine-readable medium having stored thereon machine-readable instructions to cause a machine to perform operations comprising:
detecting, from a first social network corresponding to a first user, an input made via a user interface provided by the first social network in an application linked to the first social network and a first account associated with the first user, wherein the input corresponds to a payment from the first user of the first social network to a second user of a second social network, and wherein the first social network is different from the second social network;
in response to detecting the input corresponding to the payment, referencing a database for a first payment identifier and a first authorization token corresponding to the first user, wherein the first authorization token is associated with an application permission granted to the application by the first user that allows the application to access and post data on the first social network and the second social network;
determining that the application is permitted to access profile data for the second user from the second social network based on the application permission associated with the first authorization token,
determining, based on the application permission, the profile data for the second user from social network data accessible on the second social network, and
obtaining, based on the profile data, a second payment identifier associated with the second user from the second social network;
causing, through the first social network, a payment to be made from the first account to a second account associated with the second user based at least on the second payment identifier and the profile data, wherein the first account corresponds to the first social network and the second account corresponds to the second social network;
generating a payment alert for the payment on the first social network;
authenticating with a gateway device using the first authorization token, wherein the authenticating authorizes a message adapter to adapt the payment alert to the second social network using a social messaging protocol utilized by the second social network;
adapting the payment alert for the second social network using a messaging format for the social messaging protocol; and
posting the adapted payment alert in a social message to the second user via the second account based on the adapted payment alert and the social messaging protocol.

16. The non-transitory machine-readable medium of claim 15, wherein the first authorization token is further associated with a payment permission from the first user to provide the payment to the second account of the second user.

17. The non-transitory machine-readable medium of claim 16, wherein the application permission from the first user permits the application to access user data associated with one or more user profiles of the first user on the first social network or the second social network or social post data shared by the second user with the first user on the first social network or the second social network.

18. The non-transitory machine-readable medium of claim 15, wherein the first authorization token corresponds to a permission provided by the second user that allows the application to obtain at least one of the profile data or the second payment identifier from the second social network.

19. The non-transitory machine-readable medium of claim 15, the operations further comprise:
receiving, via a permissions user interface, information corresponding to the application permission provided by the first user; and
in response to receiving the information corresponding to the first permission, creating the first authorization token based on the application permission.

20. The non-transitory machine-readable medium of claim 15, wherein the detecting the input corresponding to the payment from the first user to the second user includes detecting a selection of a selectable element provided in the user interface, wherein the selectable element corresponds to the second user.

\* \* \* \* \*